United States Patent [19]
Baughman

[11] Patent Number: 5,335,279
[45] Date of Patent: Aug. 2, 1994

[54] DIGITAL VOICE-BAND SPECTRUM INVERSION APPARATUS

[75] Inventor: David W. Baughman, Mt. Prospect, Ill.

[73] Assignee: Texas Instruments Incorporated, Dallas, Tex.

[21] Appl. No.: 99,893

[22] Filed: Jul. 30, 1993

[51] Int. Cl.⁵ .............................................. H04L 9/00
[52] U.S. Cl. ........................................ 380/38; 380/9; 380/28; 380/49
[58] Field of Search .................. 375/1; 380/9, 28, 34, 380/38, 39, 49, 50, 59; 379/61

[56] References Cited

U.S. PATENT DOCUMENTS

| | | | |
|---|---|---|---|
| 4,551,580 | 11/1985 | Cox et al. | 380/38 X |
| 4,560,832 | 12/1985 | Bond et al. | 380/49 X |
| 4,747,137 | 5/1988 | Matsunaga | 380/9 X |
| 4,937,867 | 6/1990 | Kasparian et al. | 380/9 X |
| 5,140,635 | 8/1992 | Houghton et al. | 380/38 |
| 5,168,522 | 12/1992 | Simanis et al. | 380/38 |

Primary Examiner—Bernarr E. Gregory
Attorney, Agent, or Firm—Christopher L. Maginniss; W. James Brady, III; Richard L. Donaldson

[57] ABSTRACT

A digital speech-band spectrum inversion apparatus for use in a cordless telephone system provides transmission security of the voice signal between the handset (10) and the base station (18). The apparatus includes an A/D converter (24) for converting an input analog voice-band signal to a digital signal, a digital signal processor (30) for modifying the digital signal in accordance with a prescribed algorithm, and a D/A converter (32) for converting the modified digital signal to an output analog signal, the output analog signal being inverted in frequency spectrum from the input analog signal. A/D converter (24) samples the input analog signal at a periodic rate, and converts the sampled voltage levels to digital representations thereof. The algorithm performed by the digital signal processor (30) computes the two's complement inversion of the digital representations of alternate samples of the input analog signal.

14 Claims, 3 Drawing Sheets ns of a typical cordless telephone system including remote handset 10 and base station 18. Handset 10 is shown with apertures 13 in acoustic communication with a receiving speaker 14 within handset 10, and apertures 11 in acoustic communication with a microphone 12 within handset 10. Handset 10 and base station 18 include antennas 16 and 20, respectively, for RF communications therebetween, which may, illustratively, be carried at 49 MHz.

DIGITAL VOICE-BAND SPECTRUM INVERSION APPARATUS

BACKGROUND OF THE INVENTION

The present invention relates generally to voice communications systems and, more particularly, to an apparatus for performing voice-band spectrum inversion using digital processing.

A typical cordless telephone system includes a radio frequency (RF) transmitter/receiver (transceiver) both in the handset and in the base station for communication of the voice-band signal therebetween. It has long been recognized that such RF communication between the handset and base station is subject to easy interception using other cordless telephones, scanners or baby monitors. Given the relatively small number of RF carrier frequencies available for use in cordless telephone systems of this type, it is not surprising that a concern for message security exists, even among residential users.

Because message security has long been recognized as a shortcoming of cordless telephone systems, there have been many types of solutions proposed. Historically, most of these solutions have been implemented with analog circuitry and, in particular, using custom linear integrated circuit devices. A spread spectrum approach, e.g., frequency hopping, is considerably more complex than is warranted to provide the level of telephone security needed in most consumer applications.

There is a class of solutions to the problem of cordless telephone message security which does not lend itself to implementation by analog circuitry and must, in fact, be implemented using digital techniques. Digital signal processing circuits are becoming increasingly prevalent in consumer electronic products, and their use in this type of application generally tends to provide simpler, more efficient and more reliable solutions. Furthermore, where a digital signal processor may already exist in the handset of a cordless telephone for the control of other supervisory and signaling functions, sharing its processing power within a message security sub-system my help to provide an extremely inexpensive solution to a long-felt problem.

In view of the above, it is clear that there exists a need to develop an improved apparatus and method for providing message security in cordless telephone systems than is currently known in the art. Furthermore, where such improved apparatus and method employ digital techniques, enhanced operational features may be expected to follow therefrom.

SUMMARY OF THE INVENTION

In accordance with the principles of the present invention, there is disclosed herein apparatus for modifying the frequency sperm of an input analog voice-band signal. The apparatus comprises means for convening the input analog signal to a digital signal, and means for modifying the digital signal in accordance with a predetermined algorithm, the algorithm employing two's complement inversion. The apparatus further comprises means for converting the modified digital signal to an output analog signal, the output analog signal being modified in frequency spectrum from the input analog signal.

In accordance with a preferred embodiment, the means for converting the input analog signal to a digital signal comprises means for periodically sampling the voltage level of the input analog signal, and means for converting the sampled voltage levels to digital representations thereof. The modifying means comprises means for computing the two's complement inversion of the digital representations of alternate samples of the input analog signal.

Further in accordance with the present invention there is disclosed apparatus for decoding an input analog voice-band signal which has been encoded from a plain-text analog signal by frequency spectrum inversion. The apparatus comprises means for converting the input analog signal to a digital signal, means for modifying the digital signal in accordance with a predetermined algorithm, and means for convening the modified digital signal to an output analog signal. The predetermined algorithm is chosen such that the output analog signal is substantially identical to the plain-text analog signal.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1:
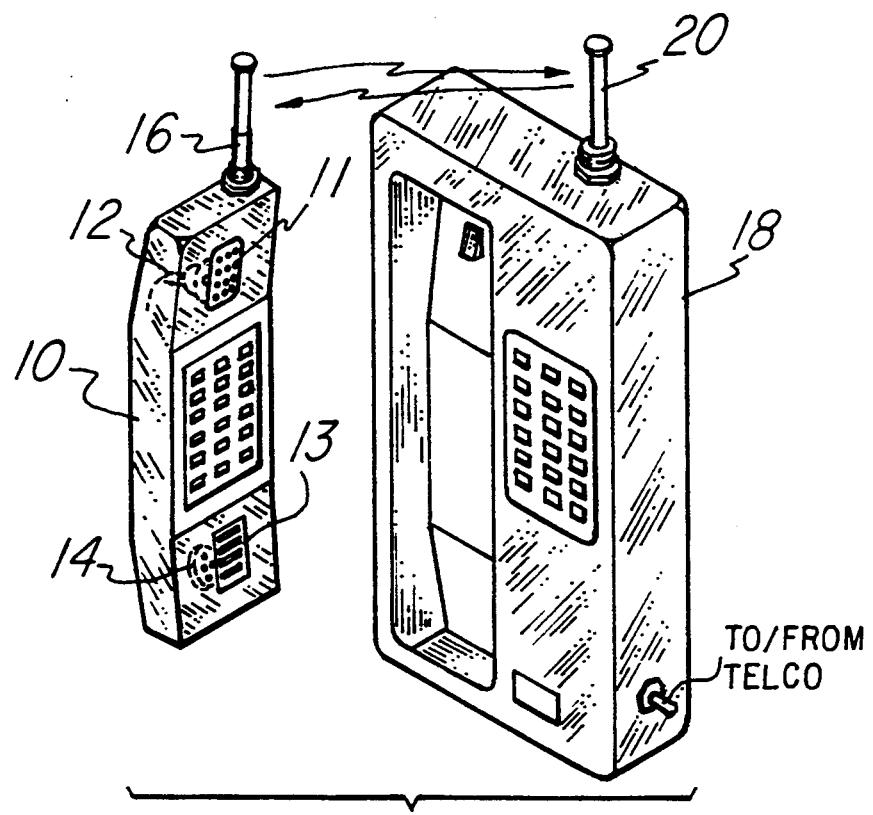
FIG. 1 illustrates the components of a cordless telephone system in which the present invention may find application.

Referring to FIG. 1, there is illustrated the compone

In operation, acoustic energy received by microphone 12 adjacent apertures 11 generates a voice-band electrical signal. This signal is used to modulate an RF signal which is transmitted from handset 10 via antenna 16. The RF carrier signal may typically be of a frequency close to 49 MHz. The transmitted RF signal is received in base station 18 through antenna 20 where it is demodulated and convened to standard telephone levels and coupled into the telephone company (telco) signal path. Similarly, a signal received at base station 18 from the telco signal path is used to modulate an RF signal and is transmitted from base station 18 via antenna 20. This transmitted RF signal is received in handset 10 through antenna 16 where it is demodulated to the voice-band spectrum and convened to appropriate levels and coupled into receiving speaker 14 adjacent apertures 13.

Figure 2:
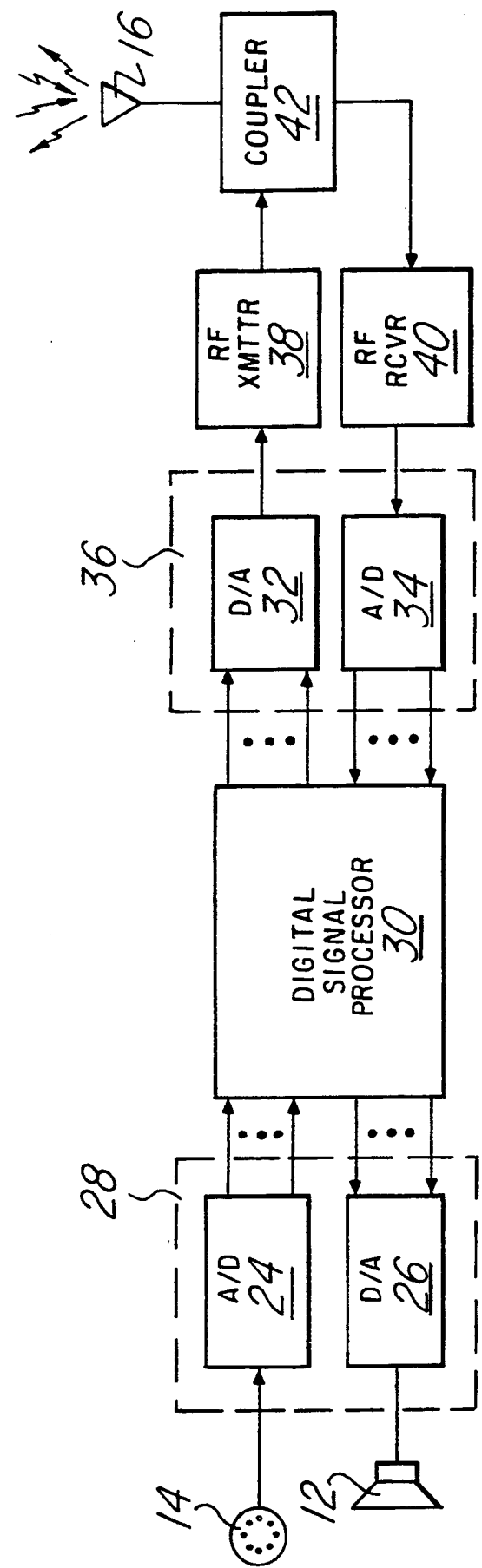
FIG. 2 is a block diagram of digital speech-band spectrum inversion apparatus in accordance with the present invention.

Referring now to FIG. 2, there is shown in block diagram form, a digital speech-band spectrum inversion apparatus in accordance with the present invention. The apparatus of FIG. 2 is preferably located both within remote handset 10 (of FIG. 1) and within base station 18 (of FIG. 1). The apparatus within remote handset 10 provides speech-band spectrum inversion of the voice signal received from microphone 12 and, similarly, it provides speech-band spectrum inversion of the RF signal received at handset 10 (after demodulation) for reproduction to acoustic energy by receiving speaker 14. The apparatus within base station 18 provides speech-band spectrum inversion of the voice signal received from the telco signal path for RF transmission to remote handset 10 and, similarly, it provides speech-band spectrum inversion of the RF signal received from handset 10 (after demodulation) for transmission into the telco signal path. Microphone 12 and receiving speaker 14 of FIG. 2 are identical to those shown with the same numerical designators in FIG. 1. Since the spectrum inversion apparatus of the present invention which is located in remote handset 10 may be identical to the spectrum inversion apparatus located in base station 18, the following detailed description of this apparatus will be limited to the one found in handset 10, as being representative of both.

A voice signal from microphone 12 is coupled to the analog input terminal of an analog-to-digital converter (A/D) 24, and the plurality of signals at the digital output terminals thereof are coupled to a digital signal processor 30. Processor 30 modifies the binary states of the individual digital input signals applied thereto, in accordance with a prescribed algorithm, and couples the modified digital signals to the plurality of digital input terminals of a digital-to-analog converter (D/A) 32. The signal at the analog output terminal thereof is applied to an RF transmitter 38 for analog processing, including, for example, modulation and amplification, for transmission to base station 18 (of FIG. 1) via coupler 42 and antenna 16.

Similarly, antenna 16 receives an RF signal from base station 18 (of FIG. 1) and couples it, via coupler 42, to an RF receiver 40. Receiver 40 processes the input RF signal, including demodulating it down to voice-band, and applies this analog voice-band signal to the analog input terminal of an A/D 34. The plurality of signals at the digital output terminals of A/D 34 are coupled to digital signal processor 30. Processor 30 modifies the binary states of the individual digital input signals applied thereto, in accordance with the same prescribed algorithm, and couples the modified digital signals to the plurality of digital input terminals of a D/A 26. The signal at the analog output terminal thereof is applied to receiving speaker 14.

A/D 24 and D/A 26 may be combined into a single functional integrated circuit unit 28, sometimes referred to as an analog interface chip (AIC). Similarly, A/D 34 and D/A 32 may be combined into a single AIC 36. It will be recognized by those of skill in the art that AIC's 28 and 36 may additionally include level shifters at their analog ports to allow interfacing with a variety of devices.

In the present example, where the spectrum of interest is at voice-band having an upper frequency of approximately 4 kHz, the Nyquist criterion requires a sampling rate at A/D's 24 and 34 of at least twice vice the highest frequency. Thus, in the present example, a sampling rate of at least approximately 8 kHz is required. Furthermore, for suitable voice quality reproduction in a system in which the voice signal is represented digitally, a resolution of at least eight bits is deemed necessary, and twelve or even sixteen bits is even more desirable. Thus, A/D's 24 and 34 and D/A's 26 and 32 should be at least eight digital bits in width.

Digital signal processor 30 modifies the incoming digital signals in accordance with a prescribed algorithm in order to perform spectrum inversion. In the present example, this algorithm performs two's complement inversion on alternate samples of the digital words received from D/A's 24 and 34, i.e., processor 30 multiplies every other digital word received from D/A's 24 and 34 by $-1$. This simple algorithm may be expressed mathematically as follows:

Sampled data input: $x[n]$; $n \in \{0,1,2,3,\ldots\}$
Sampled data output: $(-1)^n \cdot x[n]$; $n \in \{0,1,2,3,\ldots\}$.

Applying this algorithm to the data received from both D/A's 24 and 34, frequency spectrum inversion is achieved both on the voice signal (via A/D 24, processor 30 and D/A 32) and on the voice-band signal from RF receiver 40 (via A/D 34, processor 30 and D/A 26). It will be easily seen that if the set of elements comprising A/D 24, processor 30 and D/A 32 invert the voice-band spectrum of the signal from microphone 12, and if the set of elements comprising A/D 34, processor 30 and D/A 26 invert the voice-band spectrum of the signal from RF receiver 40, clearly the two sets of elements form an encoding/decoding pair, and a loopback from the output of D/A 32 to the input of A/D 34 (with or without analog signal processing through RF transmitter 38 and RF receiver 40) will provide an identical signal at speaker 14 as was sent from microphone 12. Many digital signal processors are capable of performing the digital data modification described above. By way of illustration, one such device is Model No. TMS320C17, sold by Texas Instruments, Inc., Dallas, Tex.

It should be noted that the combination of A/D 34, processor 30 and D/A 26, using the above-described frequency spectrum inverting algorithm in processor 30, will decipher an analog signal which has undergone frequency spectrum inversion by any other means, and is not limited to deciphering a signal which has been frequency spectrum inverted by the apparatus of the present invention, i.e., A/D 24, processor 30 and D/A 36.

Figure 3B:
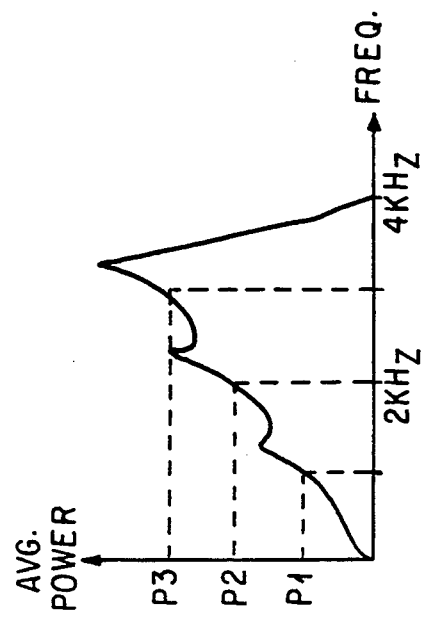
FIGS. 3a and 3b are frequency-band plots demonstrating the function of the apparatus of FIG. 2.
Figure 3A:
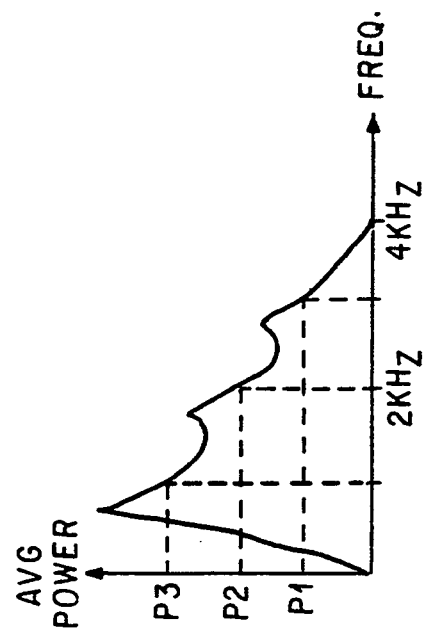

The method of operation of the present invention follows straight-forwardly from the above description of the embodiment of FIG. 2. An analog voice-band signal, typically from microphone 12, is convened to a digital signal, typically by A/D 24. This digital signal is modified, typically by digital signal processor 30, in accordance with a prescribed algorithm, such as to provide voice band spectrum inversion of the input analog signal. The disclosed algorithm performs two's complement inversion on alternate samples of the digital data words received by signal processor 30. The modified digital signal is convened to an analog signal, typically by D/A 32. The method of operation through the above-described path is functionally identical for the con,arable elements in the path including A/D 34, processor 30 and Referring now to FIGS. 3a and 3b, there are shown frequency-band plots depicting the function of the apparatus of FIG. 2. FIG. 3a illustrates the energy levels of typical human voice content over a spectrum of frequencies. FIG. 3b illustrates the energy levels of the same voice content over the same spectrum of frequencies, after being processed by the spectrum inversion apparatus as shown in FIG. 2, thus demonstrating the significant frequency shifting effects of the present invention.

The applicant has observed that the process of spectrum inversion provided by digital signal processor 30 does not limit the fidelity of speech reproduction in this invention. Rather, speech quality is a function of the resolution of the D/A and A/D converters and also, to a lesser extent, of the sampling rate of the A/D converters.

While the principles of the present invention have been demonstrated with particular regard to the structure and method disclosed herein, it will be recognized that various departures may be undertaken in the practice of the invention. The scope of the invention is not intended to be limited to the particular structure and method disclosed herein, but should instead be gauged by the breadth of the claims which follow.

What is claimed is:

1. Apparatus for modifying the frequency spectrum of an input analog voice-band signal comprising:
    means for converting said input analog signal to a digital signal including means for periodically sampling the voltage level of said input analog signal and means for converting said sampled voltage levels to digital representations thereof;
    means for modifying said digital signal including means for computing the two's complement inversion of the digital representations of alternate samples of said input analog signal; and
    means for converting said modified digital signal to an output analog signal.

2. The apparatus in accordance with claim 1 wherein said sampling means includes means for sampling said input analog signal at a rate approximately twice the upper frequency bound of said voice-band signal.

3. The apparatus in accordance with claim 1 wherein said means for converting said sampled voltage levels to digital representations generates digital words at least eight bits in length.

4. The apparatus in accordance with claim 1 wherein said means for converting said input analog signal to a digital signal comprises an analog-to-digital converter.

5. The apparatus in accordance with claim 1 wherein said means for converting said modified digital signal to an output analog signal comprises a digital-to-analog converter.

6. The apparatus in accordance with claim 1 wherein said means for modifying said digital signal comprises a digital a signal processor.

7. Apparatus for encrypting a plain-text input analog voice-band signal or for decrypting an input analog voice-band signal encrypted by said apparatus, said apparatus comprising:
    means for converting an input analog signal to a digital signal including means for periodically sampling the voltage level of said input analog signal, and means for converting said sampled voltage levels to digital representations thereof;
    means for modifying said digital signal in accordance with an algorithm which computes the two's complement inversion of the digital representations of alternate samples of said input analog signal; and
    means for converting said modified digital signal to an output analog signal, said output analog signal being modified in frequency spectrum from said input analog signal.

8. Apparatus for use in a voice communications system for encrypting a local voice signal or for decrypting a received analog voice-band signal encrypted by said apparatus, said apparatus comprising:
    means for converting an input analog signal to a digital signal including means for periodically sampling the voltage level of said input analog signal, and means for converting said sampled voltage levels to digital representations thereof;
    means for modifying said digital signal in accordance with an algorithm which computes the two's complement inversion of the digital representations of alternate samples of said input analog signal; and
    means for converting said modified digital signal to an output analog signal, said output analog signal being modified in frequency spectrum from said input analog signal.

9. Apparatus for decrypting an input analog voice-band signal which has been encrypted from a plain-text analog signal by frequency spectrum inversion, said apparatus comprising:
    means for converting said input analog signal to a digital signal including means for periodically sampling the voltage level of said input analog signal, and means for converting said sampled voltage levels to digital representations thereof;
    means for modifying said digital signal in accordance with an algorithm which computes the two's complement inversion of the digital representations of alternate samples of said input analog signal; and
    means for converting said modified digital signal to an output analog signal.

10. The apparatus in accordance with claim 9 wherein said sampling means includes means for sampling said input analog signal at a rate approximately twice the upper frequency bound of said voice-band signal.

11. The apparatus in accordance with claim 9 wherein said means for converting said sampled voltage levels to digital representations generates digital words at least eight bits in length.

12. The apparatus in accordance with claim 9, wherein said means for converting said input analog signal to digital signal comprises an analog-to-digital converter.

13. A method for modifying the frequency spectrum of an input analog voice-band signal comprising the steps of:
    converting said input analog signal to a digital signal by periodically sampling the voltage level of said input analog signal, and converting said sampled voltage levels to digital representations thereof;
    modifying said digital signal by computing the two's complement inversion of the digital representations of alternate samples of said input analog signal; and
    converting said modified digital signal to an output analog signal, said output analog signal being modified in frequency spectrum from said input analog signal.

14. The method in accordance with claim 13 wherein said sampling sub-step includes sampling said input analog signal at a rate approximately twice the upper frequency bound of said voice-band signal.

* * * * *

UNITED STATES PATENT AND TRADEMARK OFFICE
CERTIFICATE OF CORRECTION

PATENT NO. : 5,335,279
DATED : August 2, 1994
INVENTOR(S) : David W. Baughman

It is certified that error appears in the above-indentified patent and that said Letters Patent is hereby corrected as shown below:

Col. 1, line 56, delete "sperm" and substitute —spectrum—.

Col. 1, line 57, delete "convening" and substitute —converting—.

Col. 2, line 14, delete "convening" and substitute —converting—.

Signed and Sealed this

Fifteenth Day of November, 1994

Attest:

BRUCE LEHMAN

Attesting Officer     *Commissioner of Patents and Trademarks*